(12) United States Patent
Christopher

(10) Patent No.: US 10,151,419 B2
(45) Date of Patent: Dec. 11, 2018

(54) APPARATUS FOR DELIVERING MATERIAL TO A PIPE

(71) Applicant: HTC Management Services Limited, Wrexham Clwyd (GB)

(72) Inventor: Richard Christopher, Tarporley Cheshire (GB)

(73) Assignee: HTC MANAGEMENT SERVICES LIMITED, Wrexham (GB)

( * ) Notice: Subject to any disclaimer, the term of this patent is extended or adjusted under 35 U.S.C. 154(b) by 253 days.

(21) Appl. No.: 15/024,525

(22) PCT Filed: Sep. 24, 2014

(86) PCT No.: PCT/GB2014/052897
§ 371 (c)(1),
(2) Date: Jul. 1, 2016

(87) PCT Pub. No.: WO2015/044657
PCT Pub. Date: Apr. 2, 2015

(65) Prior Publication Data
US 2016/0230917 A1    Aug. 11, 2016

(30) Foreign Application Priority Data

Sep. 24, 2013  (GB) .................................. 1316936.2

(51) Int. Cl.
*F16K 11/16*    (2006.01)
*F16L 58/10*    (2006.01)
(Continued)

(52) U.S. Cl.
CPC ......... *F16L 58/1027* (2013.01); *F16L 55/164* (2013.01); *F16L 55/18* (2013.01)

(58) Field of Classification Search
CPC . F16L 55/164; F16L 58/1027; F16K 11/0876; F16K 11/0873; B01F 15/026
(Continued)

(56) References Cited

U.S. PATENT DOCUMENTS 1,385,717 A    7/1921  Sams
1,463,174 A    7/1923  Paterson et al.
(Continued)

FOREIGN PATENT DOCUMENTS

FR    2769250         9/1999
GB    1068999         5/1967
GB    2457596 A       8/2009

OTHER PUBLICATIONS

PCT/GB/2014/052897 Search Report & Written Opinion; 14 pages; dated Mar. 15, 2015.
GB1316936.2 Search Report; 4 pages; dated Nov. 18, 2013.

*Primary Examiner* — Reinaldo Sanchez-Medina
(74) *Attorney, Agent, or Firm* — Quarles & Brady LLP

(57) ABSTRACT

Apparatus for the delivery of material to a pipe is disclosed. The apparatus comprises an inlet configured, in use, to receive a fluid flow, an outlet configured, in use, to deliver the fluid flow to a pipe and an instrument receiving location for, in use, receiving at least part of an instrument. The apparatus further comprises an access arrangement for, in use, selectively providing or preventing access to the instrument receiving location, wherein the inlet and/or the instrument receiving location is configured, in use, to be connected to at least one elongate flexible conduit.

17 Claims, 3 Drawing Sheets

(51) Int. Cl.
*F16L 55/164* (2006.01)
*F16L 55/18* (2006.01)

(58) Field of Classification Search
USPC ......... 137/602, 607, 625.15, 625.31, 601.05,
137/898
See application file for complete search history.

(56) References Cited

U.S. PATENT DOCUMENTS

| | | | |
|---|---|---|---|
| 3,288,163 A | 11/1966 | Craven | |
| 4,778,083 A * | 10/1988 | Decker | B29B 7/7668 |
| | | | 137/635 |
| 4,890,648 A * | 1/1990 | Giordano | E03C 1/023 |
| | | | 137/594 |
| 5,467,796 A * | 11/1995 | Pettinaroli | F16K 5/0605 |
| | | | 134/166 C |
| 6,345,646 B1 * | 2/2002 | Ragsdale | B01F 15/0203 |
| | | | 137/897 |
| 7,118,049 B2 * | 10/2006 | Dodd | B05B 7/1209 |
| | | | 239/318 |
| 9,696,244 B2 * | 7/2017 | Carter | G01N 1/10 |
| 2007/0039653 A1 * | 2/2007 | Maggard | F16K 11/07 |
| | | | 137/625.19 |
| 2014/0299198 A1 * | 10/2014 | Diehl | F16K 11/205 |
| | | | 137/15.01 |

* cited by examiner

APPARATUS FOR DELIVERING MATERIAL TO A PIPE

BACKGROUND

The present invention relates to delivering material, such as quick-drying lining material, to a pipe.

Utilities pipes are commonly formed of metal and are susceptible to corrosion and other damage over time. Replacing damaged pipes can be difficult and expensive and it is known to provide them with a lining using a quick drying material, such as polyurethane.

GB2457596 describes methods and apparatus for lining pipes and locating an instrument within a pipe. Some versions of the apparatus disclosed comprise a nozzle for spraying lining materials inserted into a carrier air supply pipe, which is connected to the pipe that requires lining. These versions do not provide convenient access to the spray head, e.g. to perform material sampling operations, without having to fully disconnect the nozzle and the air supply pipe from the pipe being lined.

GB2457596 also discloses apparatus for locating an instrument, such as a spray head, within a pipe, the apparatus comprising a body portion with a cavity, a pipe engagement region for slideable engagement with a pipe, and an instrument retention portion for receiving at least a portion of an instrument/spray head. That apparatus is typically sealably engaged within a break in a buried domestic water pipe and allows a lining material spraying nozzle to be directed into the pipe whilst air is blown through the pipe in order to perform the lining process, and also allows the instrument retention portion to be slid outward for access, e.g. in order to perform a sampling operation. Typically, the apparatus is connected via a short pipe to air and lining material supplying components that are located within a nearby van. A problem associated with that apparatus is that it is not so practical for use with certain other types of pipes, such as gas riser pipes located within the walls of buildings, which are difficult to access and usually have significantly a smaller diameter (e.g. around 10 mm-76 mm). It is normally not convenient to cut such pipes in the described manner and insert instrument the locating apparatus in the middle of the break. Further, the apparatus does not allow air flow to continue uninterrupted whilst the instrument retention portion is in its sampling position. This can be problematic because the gel time of lining material can be brief (e.g. around 2-3 minutes) and stopping the warm air flow even temporarily can be detrimental in terms of the length of pipe that can be successfully lined by the process. Disconnecting the air flow in order to carry out a sampling operation also take time, leading to inefficiencies and increased costs, as well as resulting in unclean waste water.

SUMMARY OF THE INVENTION

Embodiments of the present invention are intended to address at least some of the abovementioned problems. Embodiments can provide instrument locating apparatus that can be connected to at least one umbilical cord-type flexible conduit that transfers an air flow and/or material used for a pipe lining process. Embodiments can also offer convenient access to a nozzle used to deliver the lining material, whilst not requiring the air flow to be passed through a part of the pipe system that is to be lined. This can provide access to the instrument receiving location whilst simultaneously allowing the fluid flow to flow from the inlet to the outlet without interruption.

According to a first aspect of the present invention there is provided apparatus for delivery of material to a pipe, the apparatus including or comprising:

an inlet configured, in use, to receive a fluid flow;

an outlet configured, in use, to deliver the fluid flow to a pipe;

an instrument receiving location for, in use, receiving at least part of an instrument, and an access arrangement for, in use, selectively providing or preventing access to the instrument receiving location, wherein the inlet and/or the instrument receiving location is configured, in use, to be connected to at least one elongate flexible conduit.

The access arrangement may provide access to the instrument receiving location whilst simultaneously allowing the fluid flow to flow from the inlet to the outlet. The inlet may receive the fluid flow via a said elongate flexible conduit.

The apparatus may further include a housing including an access aperture. The access arrangement can be configurable, in use, to provide access to the at least part of the instrument within the instrument receiving location via the access aperture.

The flexible conduit connected to the inlet will normally provide the fluid flow independently of a part of the pipe system being processed.

The access arrangement may comprise a rotatable arrangement. The access arrangement may selectively divert the fluid flow from the inlet to either:

1) the instrument receiving location prior to passing the fluid flow to the outlet, or
2) the outlet without the fluid flow passing through the instrument receiving location.

The instrument may provide at least one material to be mixed with the fluid flow prior to delivery to the pipe, which may be received via a said elongate flexible conduit. The instrument may comprise a spray head, e.g. a spray head of an injection system providing at least one pipe lining material. When the rotatable arrangement is diverting the fluid flow to the instrument receiving location, the fluid flow can be mixed with the at least one conduit lining material prior to passing the fluid flow to the outlet. The outlet may be configured, in use, to pass the fluid flow to a pipe to be lined.

When the access arrangement is diverting the fluid flow to the outlet without the fluid flow passing through the instrument receiving location, in use, the at least part of the instrument in the instrument receiving location may be accessible, e.g. for performing a lining material(s) sampling operation.

The rotatable arrangement may include:

a first rotatable member rotatable between a first position in which the member provides flow communication between the inlet and the outlet via the instrument receiving location, and a second position in which the member does not provide flow communication between the inlet and the outlet via the instrument receiving location, and a second rotatable member rotatable between a first position in which the member provides flow communication between the inlet and the outlet, and a second position in which the member does not provide flow communication between the inlet and the outlet.

Typically, when the first rotatable member is in its first position, the second rotatable member will be in its second position, and vice versa.

The first (and/or second) rotatable member may have a rounded outer surface (e.g. be substantially spherical) and the flow communication provided by the first (and/or second) rotatable member may be via form of a bore (e.g. a straight/cylindrical bore) through the rotatable member. In some embodiments, the flow communication provided by the first and the second rotatable members is provided via respective bores, wherein a first one of the bores can be oriented in a direction perpendicular to a direction of a second one of the bores.

The apparatus may further include a handle for operating the access arrangement. The handle will normally be located at least partially outside the housing.

The access arrangement may include a spindle connected to the first rotatable member. The spindle may pass through the housing. The spindle may be hollow and function as a conduit for, in use, passing at least part of an instrument into the instrument receiving location. The handle may be connected to the spindle. The apparatus may include a further spindle connecting the first rotatable member to the second rotatable member.

The apparatus may include a first branch conduit leading from the inlet to the instrument receiving location. The apparatus may include a connecting conduit leading from the inlet (e.g. via the second rotatable member) to the outlet.

According to another aspect of the present invention there is provided a kit including apparatus substantially as described herein and a material injection system. The kit may further include a vehicle or trailer on which at least part of the apparatus and/or material injection system is mounted.

According to another aspect of the present invention there is provided a conduit cleaned or lined by apparatus substantially as described herein.

According to yet another aspect of the present invention there is provided a method of delivering material into a pipe, the method including or comprising:
providing apparatus substantially as described herein;
connecting the apparatus to the pipe, and
using the apparatus to deliver material into the pipe.

According to another aspect of the present invention there is provided apparatus for delivery of material to a pipe, the apparatus including or comprising:
an inlet configured, in use, to receive a fluid flow;
an outlet configured, in use, to deliver the fluid flow to a pipe;
an instrument receiving location for, in use, receiving at least part of an instrument, and
an access arrangement for, in use, selectively providing or preventing access to the instrument receiving location,
wherein the access arrangement is configurable to provide access to the instrument receiving location whilst simultaneously allowing the fluid flow to flow from the inlet to the outlet.

According to another aspect of the present invention there is provided apparatus for locating an instrument within a pipe, the apparatus including or to comprising:
an inlet configured, in use, to receive a fluid flow;
an outlet configured, in use, to pass the fluid flow to a pipe;
an instrument receiving location for, in use, receiving at least part of an instrument, and an arrangement for selectively diverting the fluid flow from the inlet to either:
1) the instrument receiving location prior to passing the fluid flow to the outlet, or
2) the outlet without the fluid flow passing through the instrument receiving location.

According to a general aspect of the present invention there is provided apparatus for locating an instrument within a pipe (or for delivering material to a pipe), the apparatus including or comprising:

an inlet configured to, in use, receive a fluid flow;
an instrument receiving location for, in use, receiving at least part of an instrument;
an outlet for, in use, connecting the apparatus to a pipe, and
an arrangement for, in use, selectively providing and preventing access to the at least part of the instrument within the instrument receiving location.

According to a further aspect of the present invention there is provided apparatus for locating an instrument within a pipe, the apparatus including or comprising:
an inlet configured to, in use, receive a fluid flow;
an instrument receiving location for, in use, receiving at least part of an instrument;
a housing including an access aperture for the instrument receiving location;
an outlet for, in use, connecting the apparatus to a pipe, and
an arrangement for, in use, selectively providing and preventing access to the at least part of the instrument within the instrument receiving location via the access aperture.

Whilst the invention has been described above, it extends to any inventive combination of features set out above or in the following description. Although illustrative embodiments of the invention are described in detail herein with reference to the accompanying drawing, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawing in which.

DETAILED DESCRIPTION OF THE INVENTION

Figure 1:
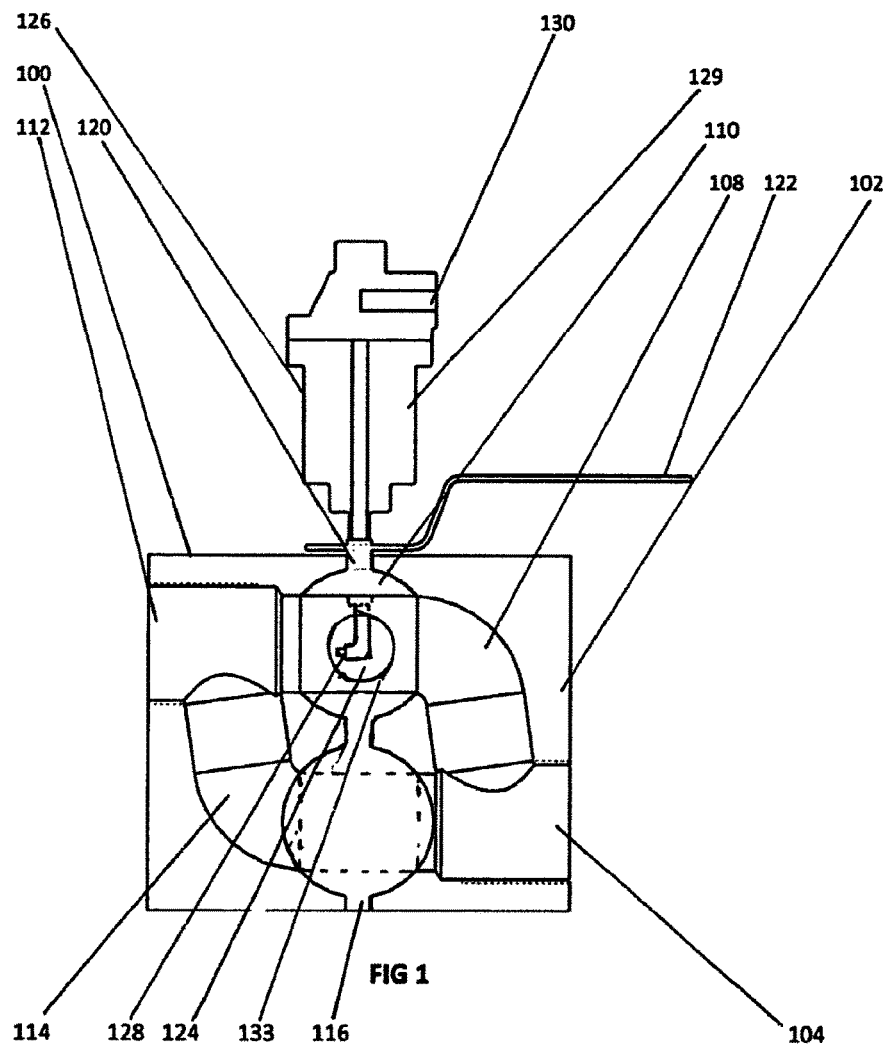
FIG. 1 is schematic side view of an embodiment of the apparatus in a first configuration.

Referring to FIG. 1, example apparatus 100 includes a housing 102 that contains at least some of the components of the apparatus. In the example, the housing is generally cuboid in shape and is formed of a rigid metal, such as steel. The housing has dimensions of around 200×200×70 mm (determined to some extent by the size of the pipe to which, as will be described below, it is connected). However, it will be appreciated that the design, dimensions and material(s) of the housing, as well as other components of the apparatus, can vary from the illustrated example. For instance, the housing may be formed to include, or be attached to, a carrying handle, that facilities hand-held use of the apparatus and/or could be formed of a non-metallic material, such as carbon fibre.

The apparatus 100 further includes an inlet 104, one end of which is configured to, in use, receive a pressurised fluid (typically warm air) flow. Typically, the inlet can be connected to a flexible pipe/umbilical cord that carries the airflow, e.g. a 3.81 cm (1.5") diameter pipe. Various attachment means, e.g. clamps, rings, or the like (not shown), can be used to connect the inlet. The attachment means can be formed, or connected to, the end of the inlet, or adjacent an aperture in the housing. Alternatively, a removable adapter or the like may be used to connect the umbilical cord to the apparatus. The other end of the inlet leads to one side of a lower rotatable member/ball valve 106, which will be described below. A branch conduit 108 can provide flow communication between the inlet and one side of an upper rotatable member 110. The opposite side of this upper rotatable member is located adjacent one end of an outlet 112. In use, the other end of the outlet can be connected to a pipe (not shown) upon which a lining operation or the like is to be performed. Again, various ways of (directly or indirectly) connecting the pipe to the outlet are possible, e.g. clamps, rings, adapters, etc. A connecting conduit 114 can also provide flow communication between the opposite side of the lower rotatable member and the outlet.

The lower rotatable member 110 is rotatably mounted within the housing 102 by means of a lower spindle 116 that extends from a central point on the lower surface of the lower rotatable member to a generally central point on the lower inner surface of the housing. A central spindle 118 extends from a central point on the upper surface of the lower rotatable member to a central point on the lower surface of the upper rotatable member 110. Thus, when one of the rotatable members is rotated, the other one rotates in a corresponding manner. A cylindrical/hollow upper spindle 120 extends from a central point on the upper surface of the upper rotatable member and a section of this spindle extends out through a substantially central aperture in the upper surface of the housing. One end of a cranked handle 122 is fixed to the outer section of the upper spindle.

The lower rotatable member 106 and the upper rotatable member 110 are both generally spherical in shape in the illustrated example. Side portions of the lower rotatable member fit into adjacent ends of the inlet 104 and the connecting conduit 114 sufficiently snugly to seal, whilst allowing the member to rotate. Side portions of the upper rotatable member fit into the adjacent ends of the branch conduit 108 and the outlet 112 in a similar manner. The upper rotatable member 110 includes a (straight cylindrical) bore 124 through its central diameter (into the page with respect to the illustrated orientation of the apparatus). The lower rotatable member also includes a central bore 132, which is generally perpendicular to the central bore 124 of the upper member (extending across between the inlet 104 and the connecting conduit 114 in FIG. 1).

The bore/cavity 124 of the upper rotatable member 110 can act as an instrument receiving location of the apparatus 100. In the illustrated example, a portion of an instrument in the form of a spray head 126 passes down through the centre of the upper spindle 120 and into the instrument receiving location. The example spray head includes a nozzle 128 positioned within the instrument receiving location. The instrument may be permanently fitted to the apparatus, or it may be removable, e.g. it may be part of an injection system or a separate component. The end of the nozzle has a perpendicular/horizontal section, which, in FIG. 1, is directed towards the outlet 112. The spray head 126 also includes a cylindrical main body 129, out of the bottom of which the nozzle portion extends, as well as an inlet 130 for connecting an injection system to the nozzle, as will be described below.

In the position shown in FIG. 1, the central bore 132 of the lower rotatable member 106 acts as a conduit/provides flow communication between the inlet 104 and the outlet 112 via the connecting conduit 114. As the central bore 124 of the upper rotatable member 110 is oriented at around 90° with respect to the bore of the lower member, the solid sides of the upper rotatable member abut/block the adjacent ends of the branch conduit 108 and the outlet 112 in this configuration, such that there is no flow communication between the inlet and outlet via the upper rotatable member/instrument receiving location. Further, at least the front or back surface of the housing 102 can include a circular aperture/sample hole 133 with which an end of the central bore 124 can be aligned when the apparatus is in this configuration. This allows a user to access the instrument (e.g. nozzle 128) positioned within the instrument receiving location, allowing a sampling operation or the like to be performed without having to remove the nozzle from the apparatus, and without having to disconnect the inlet and/or the outlet of the apparatus. Typically, the nozzle will rotate when the handle is turned, which simplifies operation, although it will be understood that in alternative embodiments, the instrument can be rotated/manipulated independently of the handle 122. Also, the end of the nozzle is shown as pointing towards the outlet 112 in the schematic drawing of FIG. 1; however, in a typical embodiment the end of the nozzle will actually point outwardly towards the hole 133 when the apparatus is in this configuration in order to allow the sampling operation to be conveniently performed.

Figure 3:
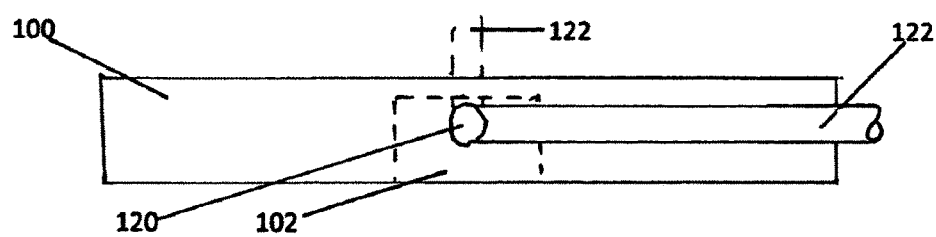
FIG. 3 is a schematic plan view of the apparatus.
Figure 2:
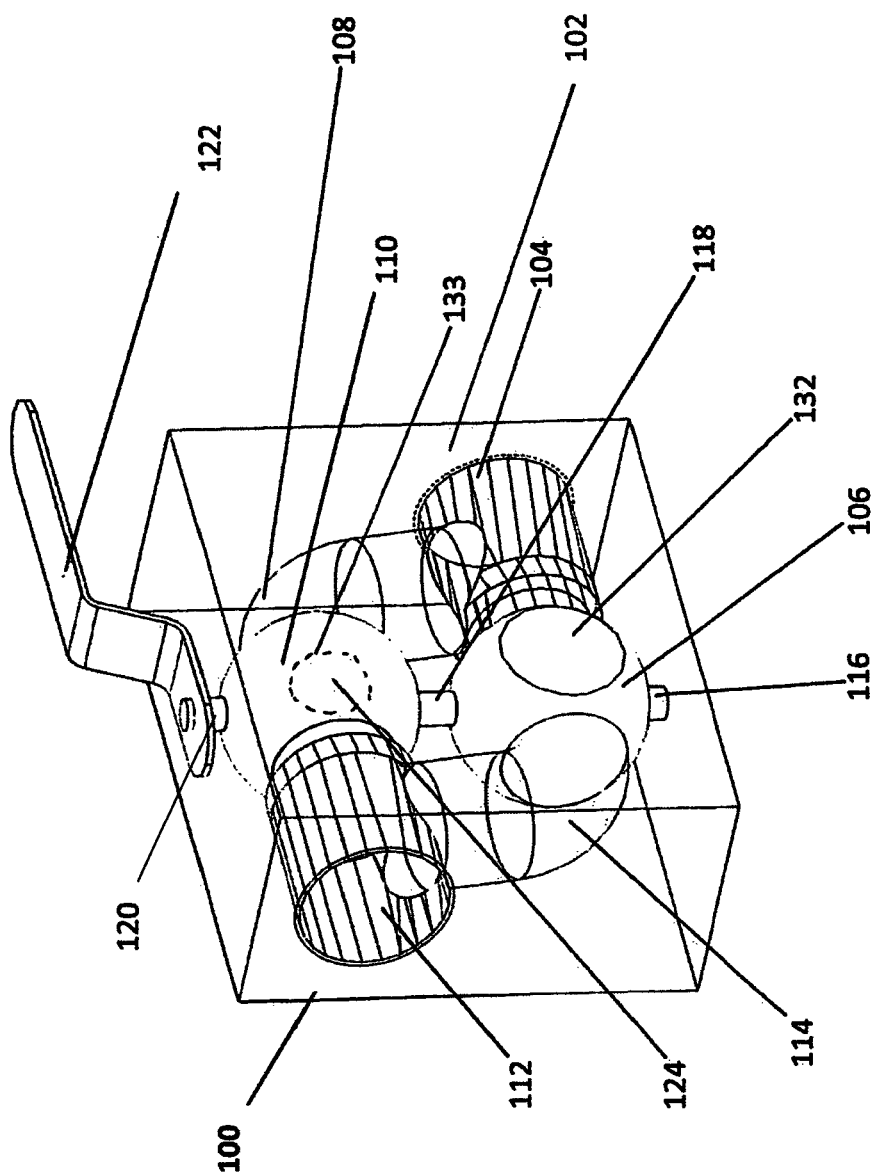
FIG. 2 is a schematic perspective view of the apparatus in a second configuration.

As illustrated in FIG. 3, in use, the handle 122 can be used to rotate the upper 110 and lower 106 rotatable members, through an angle of around 90°, between the positions of FIG. 1 and FIG. 2. When the apparatus 100 is in the configuration shown in FIG. 2 (which does not show the instrument 126), the central bore 124 of the upper rotatable member 110 provides a conduit/flow communication between the inlet 104 and the outlet 112 via the branch conduit 108. Any instrument located within the instrument receiving location cannot be accessed in this configuration because a solid side of the upper rotatable member is located against, thereby blocking, the access aperture 133. The solid side surfaces of the lower rotatable member 106 that block/abut the adjacent ends of the inlet 104 and the connecting conduit 114 are such that the lower rotatable member does not act as a conduit/provide flow communication between those parts.

Figure 4:
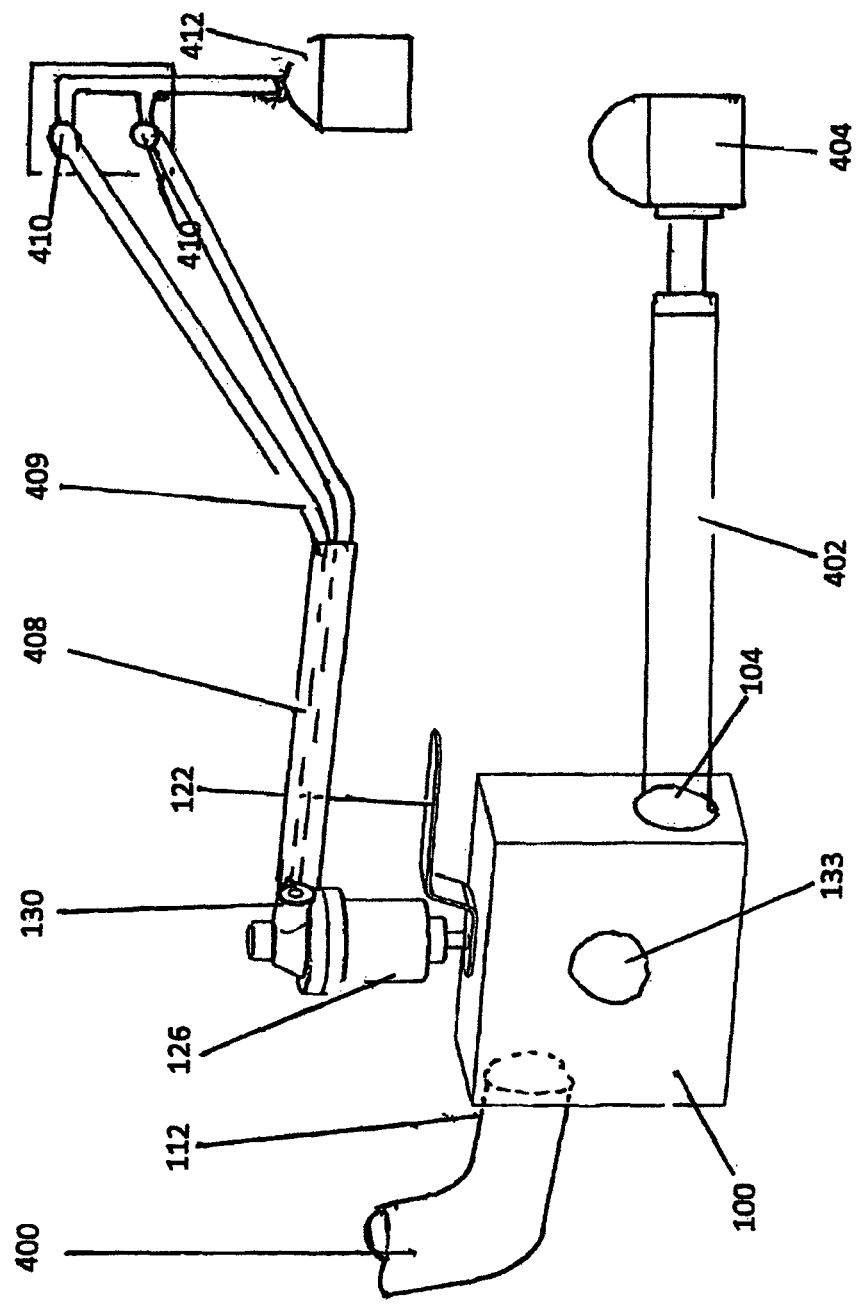
FIG. 4 is a schematic view of an example pipe lining system including the apparatus.

FIG. 4 shows an example of how the apparatus 100 can be used in practice to assist with lining a gas riser pipe 400. The outlet 112 of the apparatus is sealably fitted to a portion of the pipe. The pipe may need to be cut to facilitate this and the apparatus may be carried by an operator to the appropriate location. The inlet 104 of the apparatus is connected to a flexible umbilical cord-type conduit 402 that is connected to a pumping device 404 that provides a controllable, pressurised air flow. The flexible conduit can be around 5-8 m, or more, in length. In some embodiments, at least one other intermediate component/conduit may be located between at least one end of the conduit 402 and the inlet/pumping device.

The inlet 130 of the spray head 126 is connected to an injection system 406, which can include some components similar to those described in GB2457596 (the contents of which are hereby incorporated by reference), or any other suitable type. Various attachment means, e.g. clamps, rings, or the like (not shown), can be used to connect the inlet to a mixer pipe 408. The attachment means can be formed, or connected to, the end of the inlet, or adjacent an aperture in the housing. Alternatively, a removable adapter or the like may be used to connect the umbilical cord to the apparatus. The other end of the mixer pipe 408 is connected by means of a flexible umbilical cord-type conduit 409 to at least one source (e.g. pressure pots 410) of lining material(s) downstream of a regulated compressed gas supply 412. The flexible conduit 409 can be around 5-8 m, or more, in length. Unlike the apparatus described in GB2457596, embodiments of the present apparatus 100 can be portable/handheld and easily operated remotely by a considerable distance away from components such as 404, 410 and 412 (these will typically be located on board a vehicle, illustrated schematically by box 413) via lengthy and flexible umbilical cord-type conduits 402, 409 that supply the lining material(s) and airflow. In alternative embodiments, only one of the lining material(s) or the airflow may pass through an elongate flexible conduit. Also, in some cases, the inlet 130 may be connected directly to the flexible pipe 409 (e.g. with the mixer pipe fitted at the other end), or at least one other intermediate component/conduit may be present.

In use, the lining system of FIG. 4 can be used (e.g. in a manner similar to the operations described in GB2457596) to line at least part of the pipe 400. Embodiments of the apparatus 100 can allow easy delivery of lining material and airflow to the pipe for the lining operation, as well as providing convenient access to the nozzle for performing sampling operations and the like. They also provide the ability to simultaneously deliver the airflow to the pipe whilst performing a check that the correct mix of lining material has been supplied. The system can also be configured so that cleaning fluid can be delivered via the nozzle.

It will be appreciated that many variations to the apparatus described above are possible. For instance, the members selectively providing conduits/flow communication between the inlet/outlet/instrument receiving location need not be spherical. Although spherical members may be convenient from a manufacturing perspective, rotatable members having different shapes (e.g. cylindrical or flat/angled outer surfaces) could be used, possibly with movable parts or flexible materials at least partially surrounding them in order to maintain a fluid seal during use. The bore through one of the rotatable members could be oriented at an angle other than 90° with respect to the bore of the other member. Further, the first and second rotatable members need not be similar to each other in design or operation. Two or more rotatable members could be moved independently of one another instead of having a single axis. Alternative arrangements, such as slidable shutters or the like, could be used instead of at least one of the rotatable members. Further, part of the instrument need not be inserted into the instrument receiving location via a part, such as the upper spindle, that is used to control flow communication within the apparatus. In some cases, more than one instrument/portion may be located within the apparatus. Means other than a manual handle can be used to change the configuration of the apparatus, e.g. mechanical, electromechanical, hydraulic, pneumatic, etc, means, or even electronic means, including a remote control arrangement. At least part of the apparatus (and/or associated components) in some embodiments can be mounted/stored on a vehicle or trailer for ease of transport.

It will be understood that the apparatus described herein can have applications other than that detailed above, e.g. it could be used to line other types of pipes or deliver material for different types of processes. It will also be appreciated that the spray head of the detailed embodiment may be replaced by any instrument which requires location within a pipe, such as, but not restricted to, a sensor (including a temperature sensor, air sensor, moisture sensor or the like), a sampling device (including an air sampling device, fluid sampling device, or the like), an injecting device (to inject an additive or the like into the pipe), a camera such as a fiber optic camera device or the like to view the inside of the pipe. Such instruments may or may not be used in relation to a pipe lining operation.

What is claimed is:

1. Apparatus for delivering material to a pipe, the apparatus including: an inlet configured, in use, to receive a fluid flow; an outlet configured, in use, to deliver the fluid flow to the pipe; an instrument receiving location for, in use, receiving at least part of an instrument, and a rotatable access arrangement for, in use, selectively providing or preventing access to the instrument receiving location, comprising: a first rotatable member rotatable between a first position in which the member provides flow communication between the inlet and the outlet via the instrument receiving location, and a second position in which the member does not provide flow communication between the inlet and the outlet via the instrument receiving location, and a second rotatable member rotatable between a first position in which the member provides flow communication between the inlet and the outlet, and a second position in which the member does not provide flow communication between the inlet and the outlet, wherein the inlet and/or the instrument receiving location is configured, in use, to be connected to at least one elongate flexible conduit, and where, in use, the instrument provides at least one material to be mixed with the fluid flow prior to delivery to the pipe via the outlet.

2. Apparatus according to claim 1, further including a housing including an access aperture, wherein the access arrangement is configurable, in use, to provide access to the instrument receiving location via the access aperture.

3. Apparatus according to claim 2, wherein the access arrangement selectively diverts the fluid flow from the inlet to either:
   1) the instrument receiving location prior to passing the fluid flow to the outlet, or
   2) the outlet without the fluid flow passing through the instrument receiving location.

4. Apparatus according to claim 2, further including a handle for operating the access arrangement.

5. Apparatus according to claim 4, wherein the access arrangement includes a spindle connected to the first rotatable member.

6. Apparatus according to claim 5, wherein the spindle passes through the housing and wherein the spindle is hollow and function as a conduit for, in use, passing at least part of the instrument into the instrument receiving location.

7. Apparatus according to claim 1, wherein the instrument comprises a spray head of an injection system configured to provide at least one pipe lining material.

8. Apparatus according to claim 7, where, when the rotatable arrangement is diverting the fluid flow to the instrument receiving location, the fluid flow is mixed with the at least one pipe lining material prior to passing to the outlet.

9. Apparatus according to claim 7, where, when the first rotatable member is in its first position, the second rotatable member is in its second position.

10. Apparatus according to claim 7, wherein the first (and/or the second) rotatable member has a rounded outer surface and the flow communication provided by the first (and/or the second) rotatable member is provided via a bore through the first (and/or the second) rotatable member.

11. Apparatus according to claim 10, wherein the flow communication provided by the first and the second rotatable members is provided via respective bores, wherein a first one of the bores is oriented in a direction perpendicular to a direction of a second one of the bores.

12. Apparatus according to claim 7, further including a branch conduit leading from the inlet to the instrument receiving location.

13. Apparatus according to claim 7, further including a connecting conduit leading from the inlet, via the second rotatable member to the outlet.

14. Apparatus according to claim 1, wherein the access arrangement is configurable to provide access to the instrument receiving location whilst simultaneously allowing the fluid flow to flow from the inlet to the outlet.

15. Apparatus according to claim 1, further comprising an elongate flexible conduit configured to provide the fluid flow to the inlet, and where, in use, the flexible conduit provides the fluid flow independently of part of the pipe system being processed.

16. A method of delivering material into a pipe, the method including:
   providing apparatus according to claim 1;
   connecting the apparatus to the pipe, and
   using the apparatus to deliver material into the pipe.

17. Apparatus according to claim 1, further comprising:
   a housing including an access aperture for the instrument receiving location,
   wherein the arrangement is configured for, in use, selectively providing or preventing access to the at least part of the instrument within the instrument receiving location via the access aperture.

* * * * *

UNITED STATES PATENT AND TRADEMARK OFFICE
CERTIFICATE OF CORRECTION

PATENT NO. : 10,151,419 B2
APPLICATION NO. : 15/024525
DATED : December 11, 2018
INVENTOR(S) : Richard Christopher It is certified that error appears in the above-identified patent and that said Letters Patent is hereby corrected as shown below:

In the Specification

Column 3, Line 53, "or to comprising:" should be --or comprising--.

Signed and Sealed this
Twenty-ninth Day of January, 2019

Andrei Iancu
*Director of the United States Patent and Trademark Office*